(12) United States Patent
Cao et al.

(10) Patent No.: US 12,094,241 B2
(45) Date of Patent: Sep. 17, 2024

(54) RESONANT DRIVE SYSTEM FOR RF FACE TRACKING

(71) Applicant: Microsoft Technology Licensing, LLC, Redmond, WA (US)

(72) Inventors: Zhuo Yi Cao, Fremont, CA (US); Martin Francis Galinski, III, Santa Clara, CA (US); Chang Joon Park, Sunnyvale, CA (US); Mike Voong, San Francisco, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 358 days.

(21) Appl. No.: 17/554,401

(22) Filed: Dec. 17, 2021

(65) Prior Publication Data

US 2023/0196828 A1    Jun. 22, 2023

(51) Int. Cl.
*G06V 40/16* (2022.01)
*H02J 3/02* (2006.01)

(52) U.S. Cl.
CPC .............. *G06V 40/166* (2022.01); *H02J 3/02* (2013.01)

(58) Field of Classification Search
CPC .................................................... G06V 40/166
USPC ............................................................ 327/175
See application file for complete search history.

(56) References Cited

U.S. PATENT DOCUMENTS

2021/0125542 A1* 4/2021 Liu ..................... H05B 45/38
2021/0344233 A1  11/2021 Green et al.

OTHER PUBLICATIONS

"International Search Report and Written Opinion Issued in PCT Application No. PCT/US22/043925", Mailed Date: Jan. 31, 2023, 10 Pages.

* cited by examiner

*Primary Examiner* — Tomi Skibinski
(74) *Attorney, Agent, or Firm* — Schwegman Lundberg & Woessner, P.A.

(57) ABSTRACT

A system and method generate an alternating current (AC) input signal by a digitally controlled resonant drive circuit. The method includes driving a face tracking sensor with the input signal. An output signal is received from the face tracking sensor and an amplitude of the output signal is compared to a target amplitude. A duty cycle of the resonant drive circuit is modified based on the comparison to control the amplitude of the output signal about the target amplitude.

20 Claims, 8 Drawing Sheets

RESONANT DRIVE SYSTEM FOR RF FACE TRACKING

BACKGROUND

Mixed Reality (MR) wearable devices, such as head mounted devices, are gaining popularity. Low power and smaller form factor designs for such devices are desired for longer battery life and portability. Face tracking functions can consume significant power in wearable devices.

SUMMARY

A system and method generate an alternating current (AC) input signal by a digitally controlled resonant drive circuit. The method includes driving a face tracking sensor with the input signal. An output signal is received from the face tracking sensor and an amplitude of the output signal is compared to a target amplitude. A duty cycle of the resonant drive circuit is modified based on the comparison to control the amplitude of the output signal about the target amplitude.

DETAILED DESCRIPTION

Figure 1:
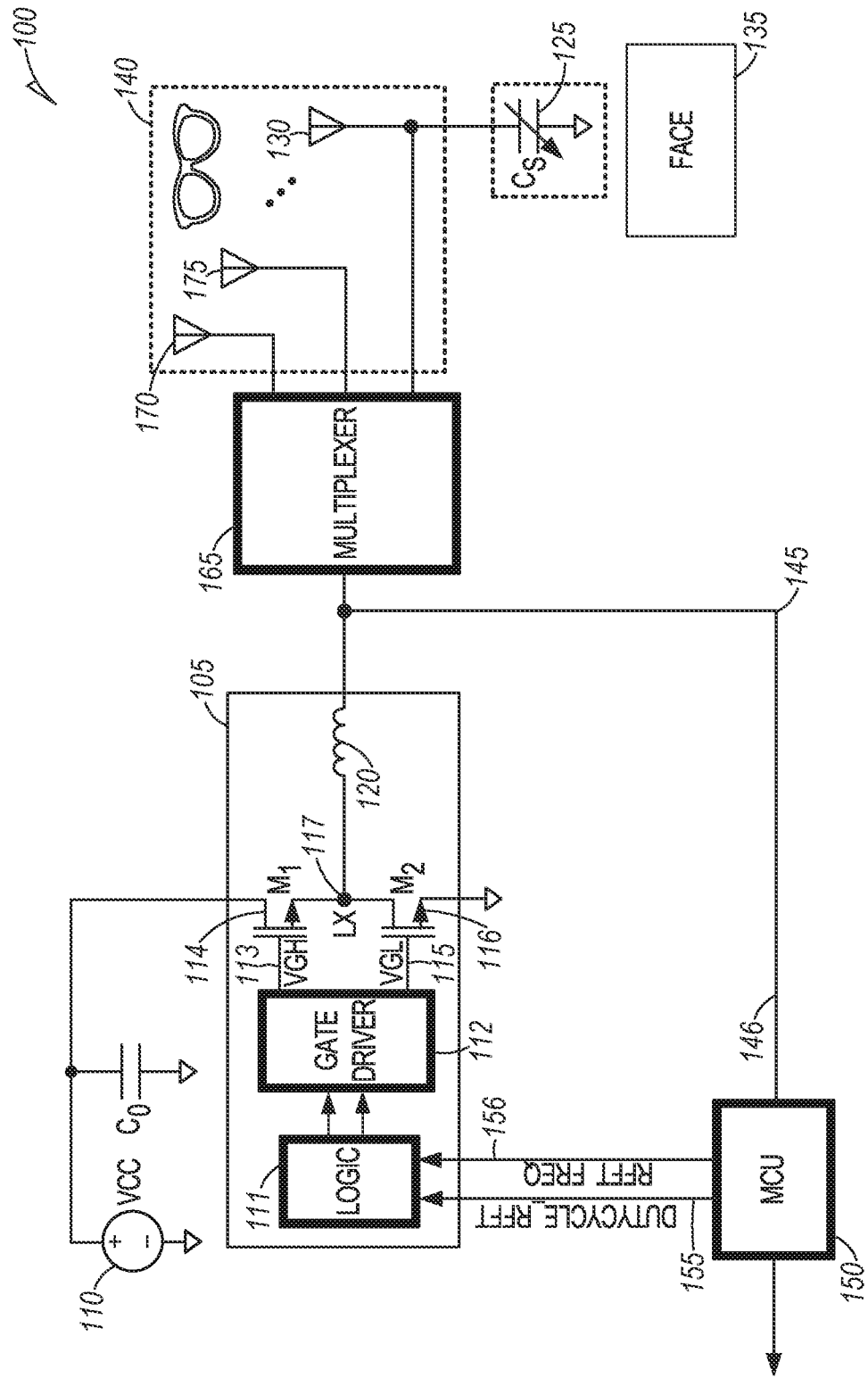
FIG. 1 is a block schematic diagram of a digitally controlled resonant drive system according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Inductor (L) and capacitor (C) (jointly "LC") resonant driving of face tracking sensors in wearable devices is a good approach for minimizing power required for face tracking. The resulting drive signal may be boosted at a target frequency due to an LC resonant frequency of a driver inductance and sense capacitance, facilitating device reliability and safety.

The sense capacitance of a face tracking system depends on the distance between a sense antenna and facial skin of the face being tracked, forming the capacitor in the LC resonant circuit. The distance will be varied with the facial expression due to facial muscles movement. Conventional LC resonant drive circuits for use in face tracking drivers require high power consumption since the sensed signal that will be processed by an analog-to-digital converter (ADC) that may be integrated into a microprocessor or ASIC should be as large as possible to achieve higher resolution. The conventional drive circuit uses a fast and low distortion operational amplifier, which is a power hungry block, as a buffer. However, the use of an LC resonant drive circuit with a direct current (DC) to alternating current (AC) converter might be the best approach to achieve large amplitude of the sensed signal without high power consumption. A half-bridge circuit can be integrated to the ASIC to help reduce the area of the sensor solution size.

The conventional DC-AC converter that uses a half-bridge driver needs a linear voltage regulator or Digital-to-Analog Converter (DAC) as the input source since the input signal should be adjusted for the target output signal amplitude accordingly. However, there is linear power loss due to a large amount of quiescent current for those circuits. A digitally controlled resonant drive scheme for radio frequency (RF) face tracking can be a great solution for an MR wearable device.

FIG. 1 is a block schematic diagram of a digitally controlled resonant drive system 100 that includes a DC-AC converter 105 that operates to convert DC power 110 to AC power. The converter 105 comprises logic circuitry 111 that controls a gate driver 112. The gate driver 112 provides a VGH signal on line 113 to a gate of a high transistor M1 114 and VGL signal on line 115 to the gate of a low transistor M2 116. VGL is simply the VGH signal inverted to alternately turn the transistors on and off to generate an alternating input signal (LX) on conductor 117. Transistors M1 114 and M2 116 operate as a half-bridge circuit.

The DC-AC converter 105 may generate the AC power having a peak voltage that is at an intermediate level being between the DC voltage of the battery, and the peak AC voltage generated by the drive system 100. The drive system 100 may also include a Q-controlled filter that uses a series inductance 120 coupled to receive the alternating signal on conductor 115. The inductance 120 may be a conventional inductor 120 or multiple inductively coupled inductors. In conjunction with a capacitance 125 that is formed by a face tracker sensor antenna 130 and facial skin 135, the AC voltage of the AC power of the alternating signal is amplified at an LC resonant frequency, 1/LC, of an RF face tracking system represented at 140.

An output conductor 145 carries an output comprising the amplified alternating signal, output signal labeled SENSE_OUT 146 that has a peak-to-peak amplitude that is adjusted by a controller 150 via duty cycle control to logic circuitry 111 in converter 105 instead of a DC voltage adjustment which is the typical way in the DC-AC converter 105. Controller 150 includes an analog to digital (AC-DC) converting in one example from which peak to peak signal amplitude may be calculated.

In one example, controller 150 generates two logic signals. A duty cycle signal 155, DutyCycle_RFFT (Radio Frequency Face Tracker) is a signal that is modified to adjust the amplitude of the SENSE_OUT 146 signal. The second logic signal is a driving frequency signal, RFFT_FREQ 156 that sets the overall frequency of the drive signal on conductor 115.

The antenna 130 may be a capacitive trace utilized in face tracking system 140, such as smart glasses or goggles that contain circuitry for interacting with augmented or virtual reality applications. The system 140 may include the circuitry of FIG. 1 integrated into a frame that may also include the power supply 110 such as a battery. It is desired to minimize the weight and size of such circuitry to optimize comfort for a wearer. At the same time, the battery should have sufficient charge to operate the system 140 for suitable periods of time without recharging or replacing the battery.

System 140 may include a multiplexer 165 to alternately drive further sensors represented at 170 and 175. As each of these sensors alternately form sense capacitors with face skin they are proximate to, the duty cycle will be modified as each is coupled to the remaining circuitry by the multiplexer 165.

Figure 2:
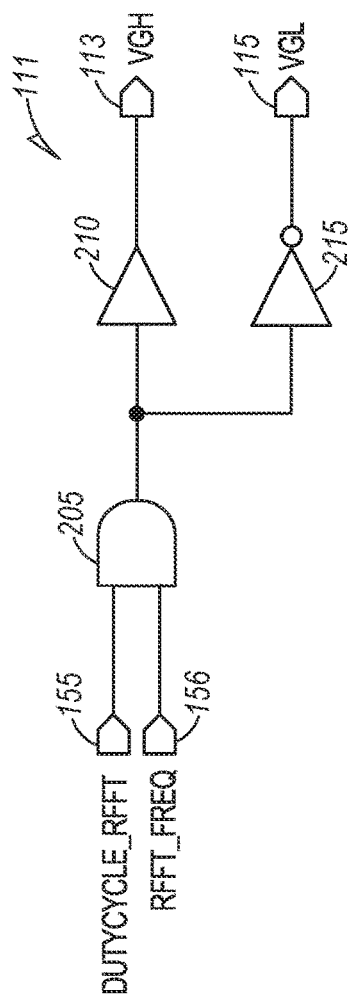
FIG. 2 is logic diagram of logic circuitry used to control a DC to AC converter according to an example embodiment.

FIG. 2 is logic diagram of logic circuitry 111. The duty cycle signal. DutyCycle_RFFT 155 driving frequency signal, RFFT_FREQ 156 are provided from the controller 150 to an AND gate 205. The AND gate 205 is coupled to a pair of amplifiers 210 and 215 coupled in parallel. Amplifier 210 simply provides the logic signal from AND gate 205 while amplifier 215 inverts the logic signal from AND gate 205. Amplifier 210 provide VGH 113 while inverting amplifier 215 provide VGL 115. While FIG. 2 illustrates a solution using an AND gate 205, equivalent solutions are possible using other gates, such as OR, XOR, negate, or a combination thereof.

Figure 3:
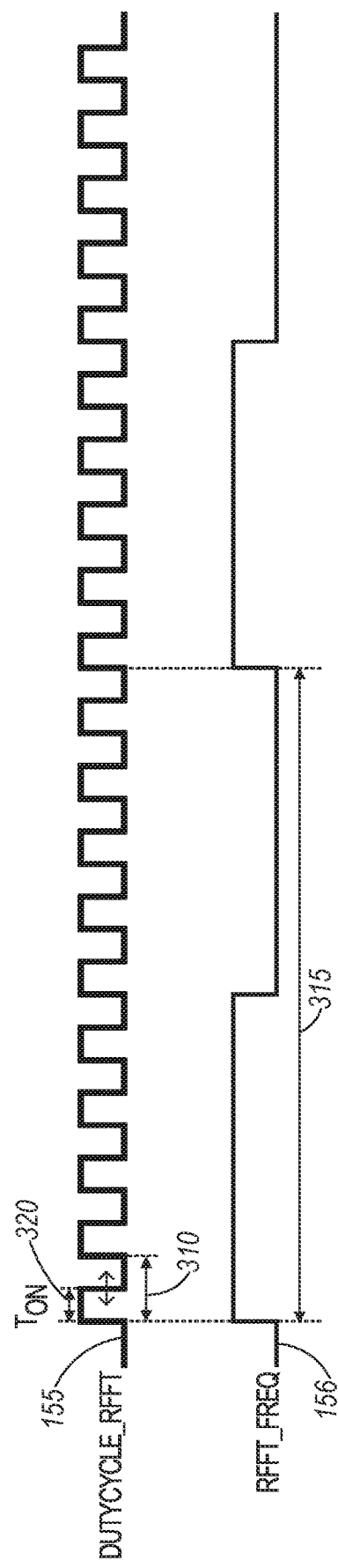
FIG. 3 is a timing diagram illustrating a duty cycle signal and driving frequency signal according to an example embodiment.

FIG. 3 is a timing diagram illustrating the duty cycle signal, DutyCycle_RFFT 155, having a period (one cycle) shown at 310, and driving frequency signal, RFFT_FREQ 156, having a period (one cycle) shown at 315. In one example, the duty cycle signal is a square wave having a frequency great than that of the driving frequency signal. The high level logic "1" or "on" of the duty cycle is shown at 320.

One signal mainly controls the output amplitude using the duty cycle adjustment (DutyCycle_RFFT 155), and the other signal sets the driving frequency of the resonant drive circuit for RF Facial Tracking (RFFT_FREQ_156). In one example, DutyCycle_RFFT 155 is approximately 10 times higher frequency than RFFT_FREQ 156. Linear power loss from the fixed DC power source like battery 110 is reduced. Also, the half-bridge circuit can be integrated in an ASIC with the processing circuitry without requiring high power supplies. Due to the logic circuitry being fairly simple, layout area may be reduced and power efficiency increased.

The input amplitude of DC-AC converter can be adjusted by the duty cycle control to meet the system target AC signal amplitude. The resonance frequency will change with sense capacitance 125 variations. The gain and phase at the output of the drive circuit, converter 105 at the fixed input frequency will accordingly be changed with sense capacitance variations that change the output signal 146. Very large output signal amplitude can be achieved with small input signal due to the peak gain at the resonant frequency.

Figure 4:
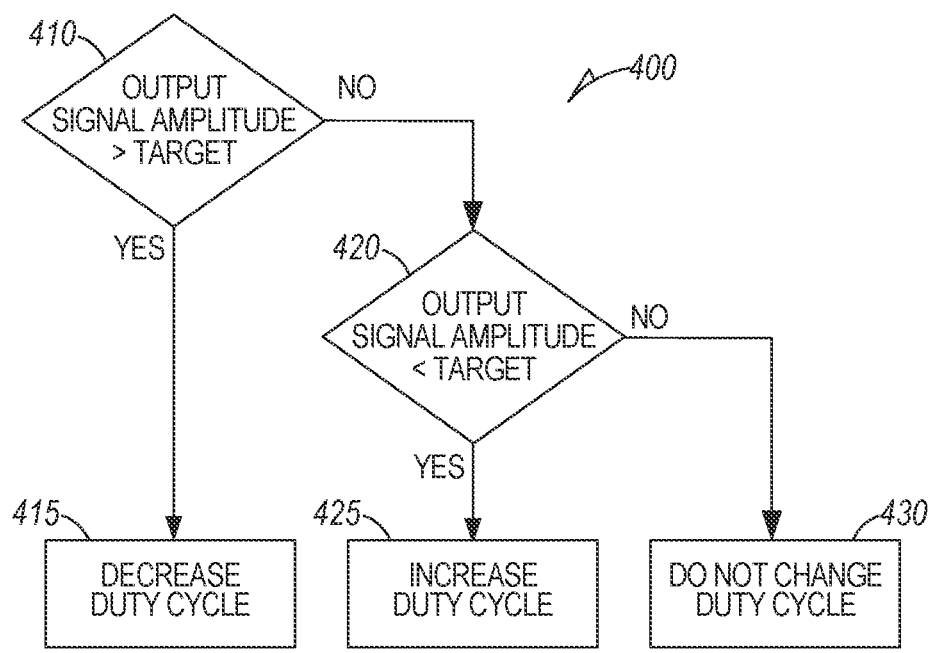
FIG. 4 is a flow diagram illustrating a method for controlling the duty cycle based on a comparison of the output signal amplitude to a target amplitude according to an example embodiment.

FIG. 4 is a flow diagram illustrating a method 400 for controlling the duty cycle based on a comparison of the output signal amplitude to a target amplitude. Method 400 may be implemented by software in controller 150 or via hardware or a combination of both. The target amplitude may be fixed in one example at a magnitude that provides optimal magnitude for sensing while minimizing energy consumption of battery 110.

At operation 410, the output signal amplitude is compared to the target amplitude, such as 20 volts peak to peak, to determine if the output signal amplitude is greater than the target amplitude. Other peak to peak target amplitudes may be used in further examples. If yes at operation 410, the duty cycle frequency is reduced at operation 415 and processing returns to operation 410 to periodically perform further checking. If no, the output signal amplitude is compared to the targe amplitude to determine if the output signal amplitude is less than the target amplitude. If yes, the duty cycle in increased at operation 425 and processing returns to operation 410 to periodically perform further checking. If no, the duty cycle is not changed at operation 430 and processing returns to operation 410 to periodically perform further checking.

In one example, the duty cycle may be changed to provide the target voltage desired. The duty cycle ends up being a function of the effective voltage desired. For example, given a power source 110 of 3.3 volts, if the desired signal amplitude is 1 volt, the duty cycle would be a function of that 1 volt divided by 3.3 volts. The change can be calculated in the same manner. If below the target amplitude by 0.1 volts, the duty cycle may be increased by 0.01 divided by 3.3 volts. An increase less than that may be used in some examples to more slowly converge on the target amplitude if there are sufficient cycles for each sensor to allow a slower convergence.

Figure 5:
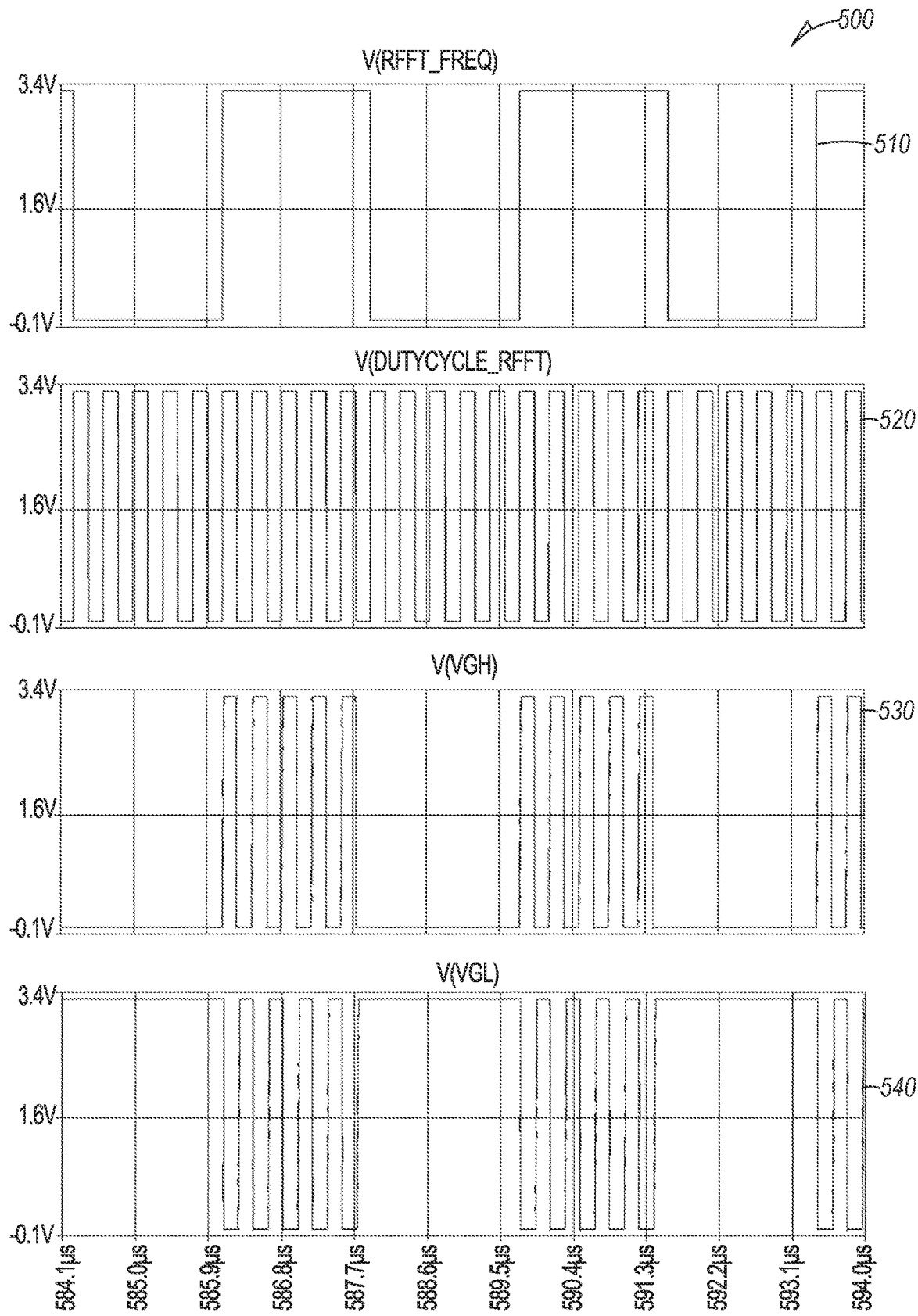
FIG. 5 is a timing diagram illustrating control signals according to an example embodiment.

FIG. 5 is a timing diagram illustrating control signals generally at 500. Trace 510 illustrates the driving frequency signal voltage V(RFFT_FREQ 156). Trace 520 illustrates the duty cycle signal voltage V(DutyCycle_RFFT 155). The VGH signal 113 voltage is shown at trace 530 and the VGL signal 115 voltage is shown at trace 540. VGH is low while the driving frequency signal is low and tracks with the duty cycle signal while the driving frequency signal is high. VGL is inverted from VGH. As shown in FIG. 1, VGH and VGL operate to turn on and off respective transistors M1 114 and M2 116 to provide the output signal.

Figure 6A:
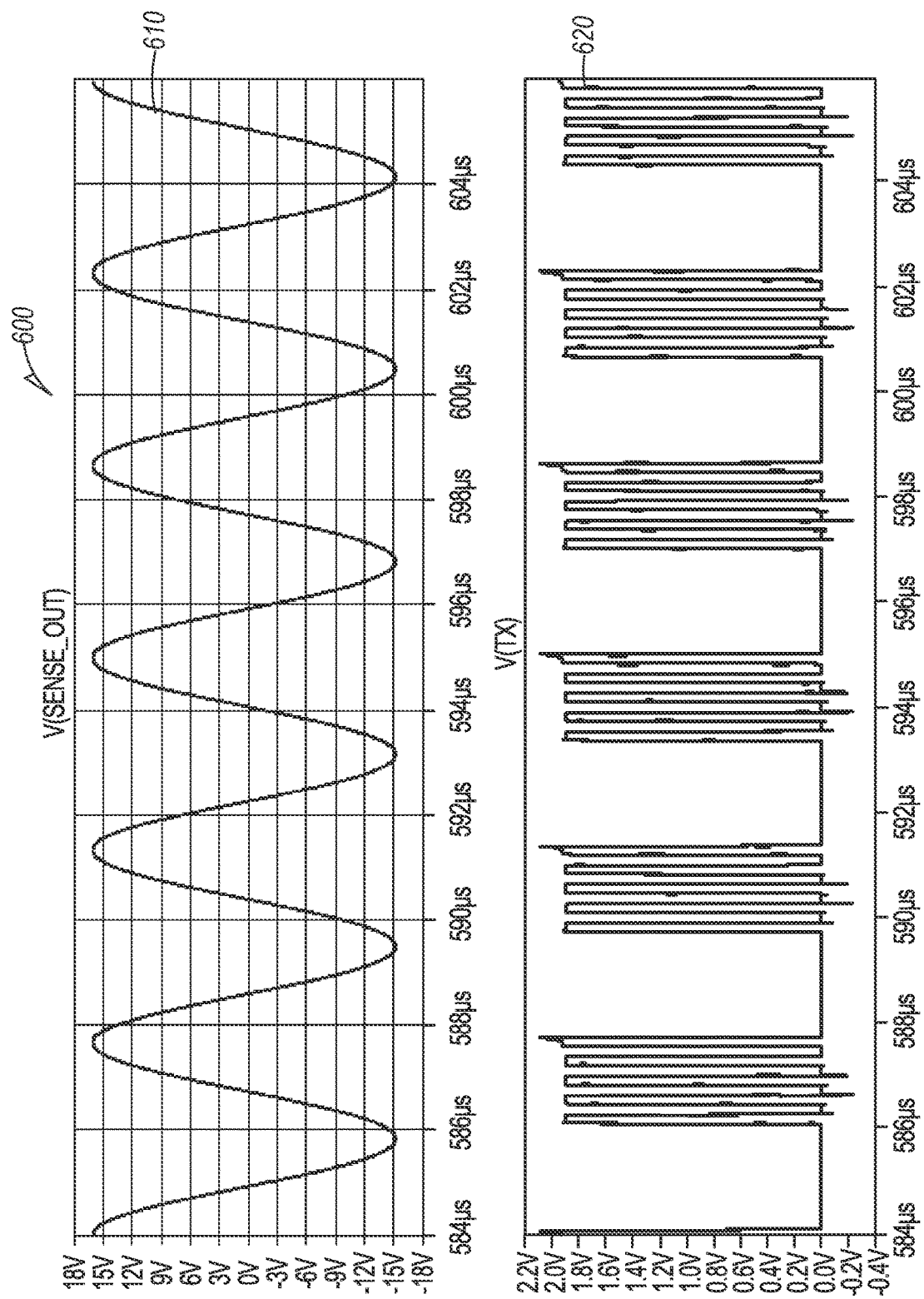
FIGS. 6A and 6B are timing diagrams illustrating the transient responses at the resonant frequency and corresponding control signals according to an example embodiment.
Figure 6B:
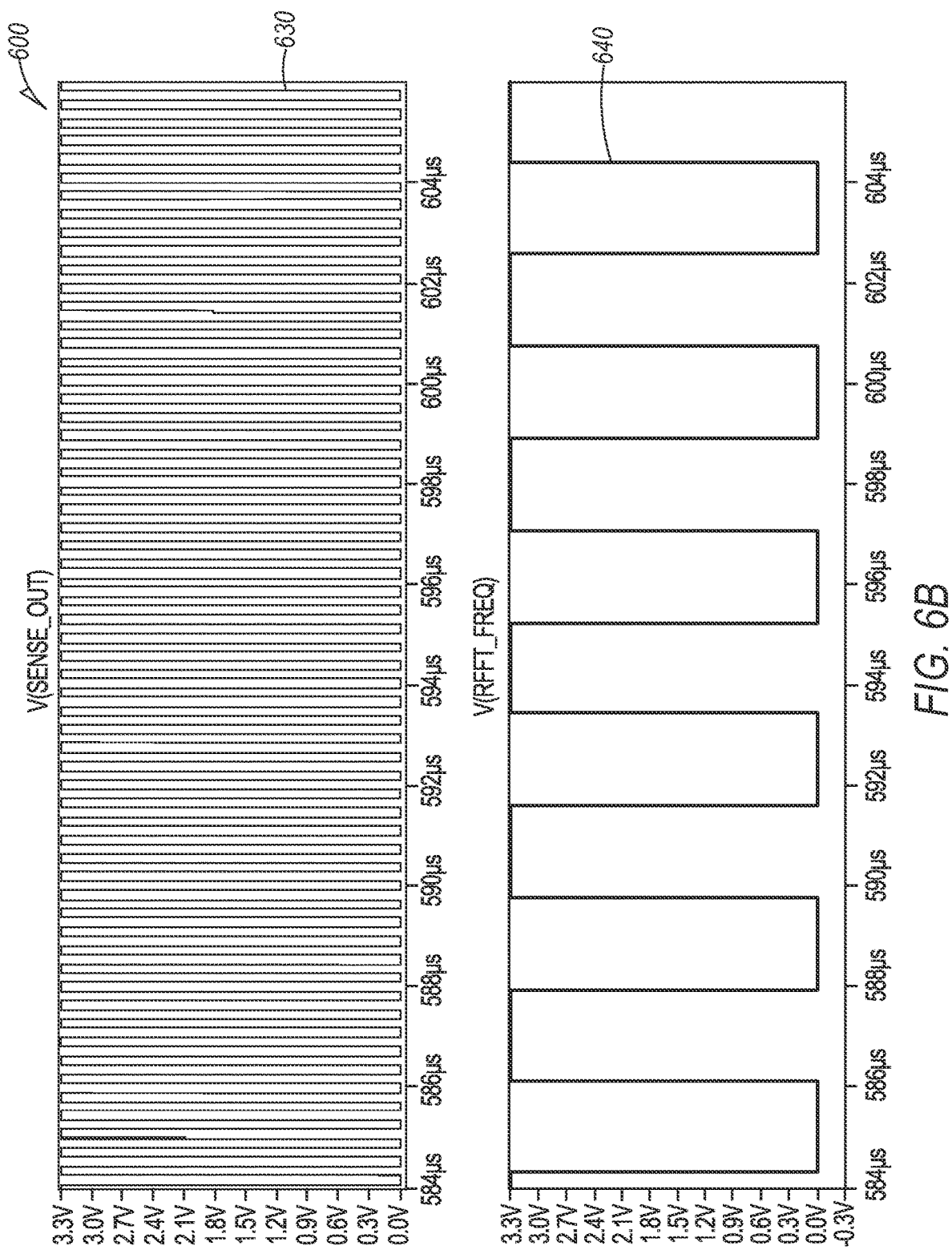

FIGS. 6A and 6B are timing diagrams illustrating the transient responses at the resonant frequency and corresponding control signals generally at 600. The voltage output from the transistors M1 113 and M2 116 is shown at trace 620. The output signal voltage, V(sense_out) resulting from the LC resonant circuit comprising inductance 120 and sense capacitance 125 is shown at trace 610. The duty cycle signal voltage is shown at trace 630 and the driving frequency signal voltage is shown at trace 640.

The resonant drive system 100 can eliminate linear power loss due to DC-AC drive signal conversion or power loss in a linear regulator that supplies the DC voltage to the DC-AC converter circuitry since the output signal amplitude of the resonant drive system is adjusted by duty cycle control with the fixed DC input source 160. The system 100 can achieve an amplified sensed signal with low power consumption and the fixed DC voltage source can be utilized as the input of DC-AC converter circuitry. The input signal 117 can be adjusted with the duty cycle control that applies to the charging and discharging time in the resonant drive circuit which includes the half-bridge circuit and inductor and logic 11 of the gate driver 112. Battery life can be prolonged as the linear power loss can be avoided from the input power source. In other words, the low power face tracking solution for MR wearable device can be achieved with the digitally controlled resonant drive system 100.

System 100 helps to realize low power and compact wearable devices like those used in MR including Augmented Reality (AR) goggles and glass which use a DC-AC converter 105 that consists of the fixed input voltage source, half-bridge drive circuit, and Q-controlled filter as an output filter.

Figure 7:
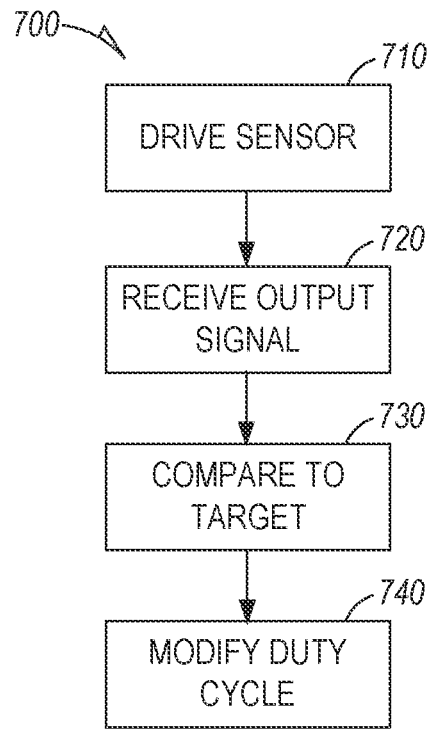
FIG. 7 is a flowchart illustrating a method of controlling an amplitude of an output signal for one or more face tracking sensors according to an example embodiment.

FIG. 7 is a flowchart illustrating a method 700 of controlling an amplitude of an output signal for one or more face tracking sensors of a head mounted device. Method 700 begins at 710 by driving a face tracking sensor with an AC input signal generated by a digitally controlled resonant drive circuit. At 720, an output signal is received from the face tracking sensor. The amplitude of the output signal is compared to a target amplitude at 730. At 740 a duty cycle of the resonant drive circuit is modified to control the amplitude of the output signal about the target amplitude.

Modifying the duty cycle comprises decreasing the duty cycle in response to the amplitude of the output signal being greater than the target amplitude. The duty cycle is increased in response to the amplitude of the output signal being less than the target amplitude to increase the drive signal to the sensor.

Driving the face tracking sensor with the AC input signal is done by performing a logic AND of a duty cycle digital signal and a drive frequency digital signal to generate a first digital input signal. A half bridge pair of transistors coupled to an LC resonant circuit is then driven to generate the AC input signal.

In one example, the drive frequency digital signal is held constant and the duty cycle has a nominal frequency that is about ten times a frequency of the drive frequency digital signal. The duty cycle is modified as a function of a DC supply voltage and the target amplitude and in one example as a function of the target amplitude divided by a DC supply voltage.

Multiple face tracking sensors may be alternately driven via a multiplexer coupled to receive the AC input signal. Each face tracking sensor is driven at least once cycle of the drive frequency that is less than a nominal frequency of the duty cycle. In one example, each tracking sensor is driven for several drive frequency cycles corresponding to 10 msec or more.

Figure 8:
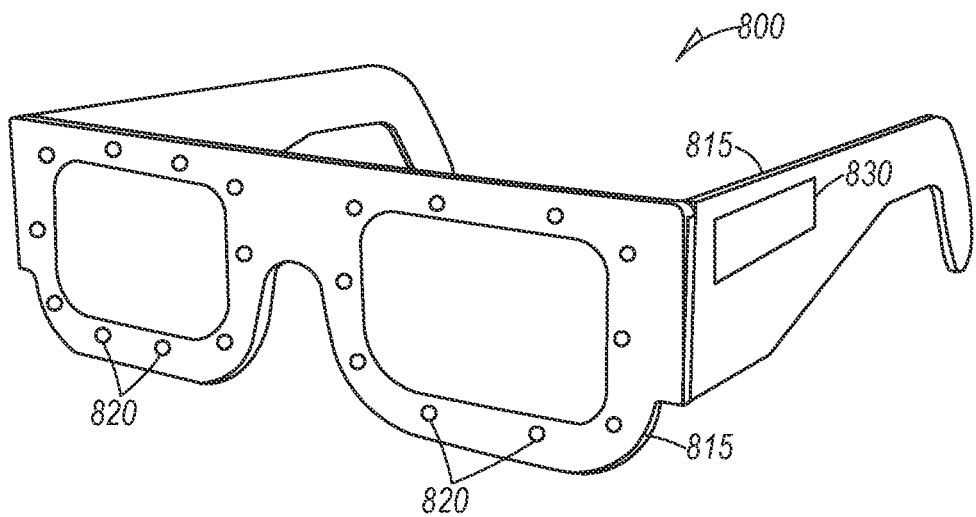
FIG. 8 is a block diagram of a system for eye tracking according to an example embodiment.

FIG. 8 is a block diagram of a system 800 for eye tracking. System 800 may include a head mounted display device shown in the form of a pair of glasses 810 having a frame 815 that includes multiple face tracking sensors, some of which are indicated at 120.

The frame 815 may also include a digitally control resonant drive circuit 830 as shown in further detail in FIG. 1, coupled to provide the face tracking sensors 820 an AC input signal. Circuit 830 also includes the controller coupled to receive an output signal from the face tracking sensors 820. A previously described, the controller compares the amplitude of the output signal to a target amplitude and modifies the duty cycle of the resonant drive circuit to control the amplitude of the output signal about the target amplitude.

Figure 9:
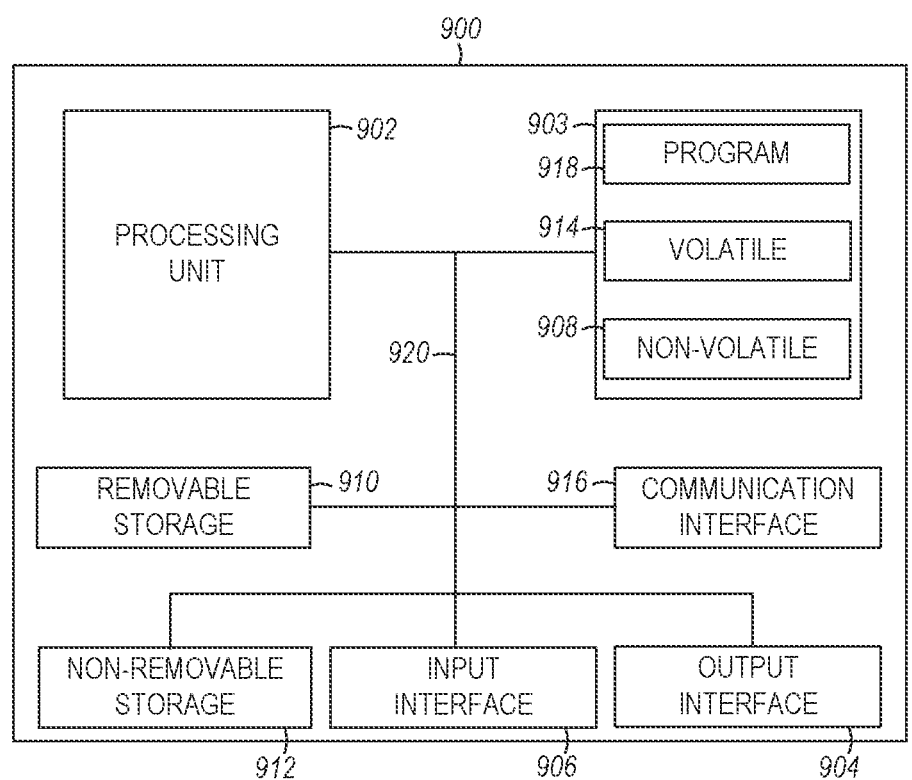
FIG. 9 is a block schematic diagram of a computer system to implement one or more example embodiments.

FIG. 9 is a block schematic diagram of a computer system 900 to perform control functions for modulating the duty cycle, implementing devices that include face tracking, and for performing methods and algorithms according to example embodiments. All components need not be used in various embodiments.

One example computing device in the form of a computer 900 may include a processing unit 902, memory 903, removable storage 910, and non-removable storage 912. Although the example computing device is illustrated and described as computer 900, the computing device may be in different forms in different embodiments. For example, the computing device may instead be a smartphone, a tablet, smartwatch, smart storage device (SSD), or other computing device including the same or similar elements as illustrated and described with regard to FIG. 9. Devices, such as smartphones, tablets, and smartwatches, are generally collectively referred to as mobile devices or user equipment.

Although the various data storage elements are illustrated as part of the computer 900, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 903 may include volatile memory 914 and non-volatile memory 908. Computer 900 may include—or have access to a computing environment that includes—a variety of computer-readable media, such as volatile memory 914 and non-volatile memory 908, removable storage 910 and non-removable storage 912. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 900 may include or have access to a computing environment that includes input interface 906, output interface 904, and a communication interface 916. Output interface 904 may include a display device, such as a touchscreen, that also may serve as an input device. The input interface 906 may include one or more of a touchscreen, touchpad, mouse, keyboard, camera, one or more device-specific buttons, one or more sensors integrated within or coupled via wired or wireless data connections to the computer 900, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular. Wi-Fi, Bluetooth, or other networks. According to one embodiment, the various components of computer 900 are connected with a system bus 920.

Computer-readable instructions stored on a computer-readable medium are executable by the processing unit 902 of the computer 900, such as a program 918. The program 918 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 918 along with the workspace manager 922 may be used to cause processing unit 902 to perform one or more methods or algorithms described herein.

EXAMPLES

1. A method generates an alternating current (AC) input signal by a digitally controlled resonant drive circuit. The method includes driving a face tracking sensor with the input signal. An output signal is received from the face tracking sensor and an amplitude of the output signal is compared to a target amplitude. A duty cycle of the resonant drive circuit is modified based on the comparison to control the amplitude of the output signal about the target amplitude.

2. The method of example 1 wherein modifying the duty cycle includes decreasing the duty cycle in response to the amplitude of the output signal being greater than the target amplitude.

3. The method of example 1 wherein modifying the duty cycle includes increasing the duty cycle in response to the amplitude of the output signal being less than the target amplitude.

4. The method of example 1 wherein driving the face tracking sensor with the AC input signal includes performing a logic AND of a duty cycle digital signal and a drive frequency digital signal to generate a first digital input signal and driving a half bridge pair of transistors coupled to an inductor-capacitor (LC) resonant circuit to generate the AC input signal.

5. The method of example 4 wherein the drive frequency digital signal is held constant.

6. The method of example 4 wherein the duty cycle has a nominal frequency that is about ten times a frequency of the drive frequency digital signal.

7. The method of example 1 wherein the duty cycle is modified as a function of a DC supply voltage and the target amplitude.

8. The method of example 1 wherein the duty cycle is modified as a function of the target amplitude divided by a DC supply voltage.

9. The method of example 1 and further comprising alternately driving multiple face tracking sensors via a multiplexer coupled to receive the AC input signal.

10. The method of example 9 wherein each face tracking sensor is driven at least once cycle of a drive frequency that is less than a nominal frequency of the duty cycle.

10. A system includes a head mounted display device having a frame with a face tracking sensor, a digitally control resonant drive circuit coupled to provide the face tracking sensor an alternating current (AC) input signal, and a controller coupled to receive an output signal from the face tracking sensor, compare an amplitude of the output signal to a target amplitude, and modify a duty cycle of the resonant drive circuit to control the amplitude of the output signal about the target amplitude.

12. The system of example 11 wherein the controller modifies the duty cycle comprises decreasing the duty cycle in response to the amplitude of the output signal being greater than the target amplitude.

13. The system of example 11 wherein the controller modifies the duty cycle comprises increasing the duty cycle in response to the amplitude of the output signal being less than the target amplitude.

14. The system of example 10 wherein the controller generates a duty cycle digital signal and a drive frequency digital signal and wherein the drive circuit includes logic circuitry to AND the duty cycle digital signal and drive frequency digital signal to provide a gate drive signal, a half bridge to receive the gate drive signal and alternately drive a high transistor and a low transistor to generate a half bridge output signal, and an inductor/capacitor (LC) resonant circuit coupled to receive the half bridge output signal and generate the AC input signal.

15. The system of example 14 wherein the drive frequency digital signal is held constant.

16. The system of example 14 wherein the duty cycle has a nominal frequency that is about ten times a frequency of the drive frequency digital signal.

17. The system of example 11 wherein the duty cycle is modified as a function of a direct current (DC) supply voltage and the target amplitude.

18. The system of example 11 wherein the duty cycle is modified as a function of the target amplitude divided by a DC supply voltage.

19. The system of example 11 wherein the head mounted display device includes multiple face tracking sensors, the system further including a multiplexer coupled to receive the AC input signal and alternately drive the multiple face tracking sensors.

20. The system of example 19 wherein each face tracking sensor is driven at least once cycle of a drive frequency that is less than a nominal frequency of the duty cycle.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
generating an alternating current (AC) input signal by a digitally controlled resonant drive circuit;
driving a face tracking sensor with the input signal;
receiving an output signal from the face tracking sensor;
comparing an amplitude of the output signal to a target amplitude; and
modifying a duty cycle of the resonant drive circuit to control the amplitude of the output signal about the target amplitude.

2. The method of claim 1 wherein modifying the duty cycle comprises decreasing the duty cycle in response to the amplitude of the output signal being greater than the target amplitude.

3. The method of claim 1 wherein modifying the duty cycle comprises increasing the duty cycle in response to the amplitude of the output signal being less than the target amplitude.

4. The method of claim 1 wherein driving the face tracking sensor with the AC input signal comprises:
performing a logic AND of a duty cycle digital signal and a drive frequency digital signal to generate a first digital input signal; and
driving a half bridge pair of transistors coupled to an inductor-capacitor (LC) resonant circuit to generate the AC input signal.

5. The method of claim 4 wherein the drive frequency digital signal is held constant.

6. The method of claim 4 wherein the duty cycle has a nominal frequency that is about ten times a frequency of the drive frequency digital signal.

7. The method of claim 1 wherein the duty cycle is modified as a function of a DC supply voltage and the target amplitude.

8. The method of claim 1 wherein the duty cycle is modified as a function of the target amplitude divided by a DC supply voltage.

9. The method of claim 1 and further comprising alternately driving multiple face tracking sensors via a multiplexer coupled to receive the AC input signal.

10. The method of claim 9 wherein each face tracking sensor is driven at least once cycle of a drive frequency that is less than a nominal frequency of the duty cycle.

11. A system comprising:
a head mounted display device having a frame with a face tracking sensor;
a digitally control resonant drive circuit coupled to provide the face tracking sensor an alternating current (AC) input signal; and
a controller coupled to:
receive an output signal from the face tracking sensor;
compare an amplitude of the output signal to a target amplitude; and
modify a duty cycle of the resonant drive circuit to control the amplitude of the output signal about the target amplitude.

12. The system of claim 11 wherein the controller modifies the duty cycle comprises decreasing the duty cycle in response to the amplitude of the output signal being greater than the target amplitude.

13. The system of claim 11 wherein the controller modifies the duty cycle comprises increasing the duty cycle in response to the amplitude of the output signal being less than the target amplitude.

14. The system of claim 11 wherein the controller generates a duty cycle digital signal and a drive frequency digital signal and wherein the drive circuit comprises:
logic circuitry to AND the duty cycle digital signal and drive frequency digital signal to provide a gate drive signal;
a half bridge to receive the gate drive signal and alternately drive a high transistor and a low transistor to generate a half bridge output signal; and
an inductor/capacitor (LC) resonant circuit coupled to receive the half bridge output signal and generate the AC input signal.

15. The system of claim 14 wherein the drive frequency digital signal is held constant.

16. The system of claim 14 wherein the duty cycle has a nominal frequency that is about ten times a frequency of the drive frequency digital signal.

17. The system of claim 11 wherein the duty cycle is modified as a function of a direct current (DC) supply voltage and the target amplitude.

18. The system of claim 11 wherein the duty cycle is modified as a function of the target amplitude divided by a DC supply voltage.

19. The system of claim 11 wherein the head mounted display device includes multiple face tracking sensors, the system further comprising a multiplexer coupled to receive the AC input signal and alternately drive the multiple face tracking sensors.

20. The system of claim 19 wherein each face tracking sensor is driven at least once cycle of a drive frequency that is less than a nominal frequency of the duty cycle.

* * * * *